Nov. 7, 1944.  G. Q. HEPPNER  2,362,374
CULTIVATING AND WEEDING ATTACHMENT FOR MOTORCYCLES
Filed Dec. 23, 1943  3 Sheets-Sheet 1
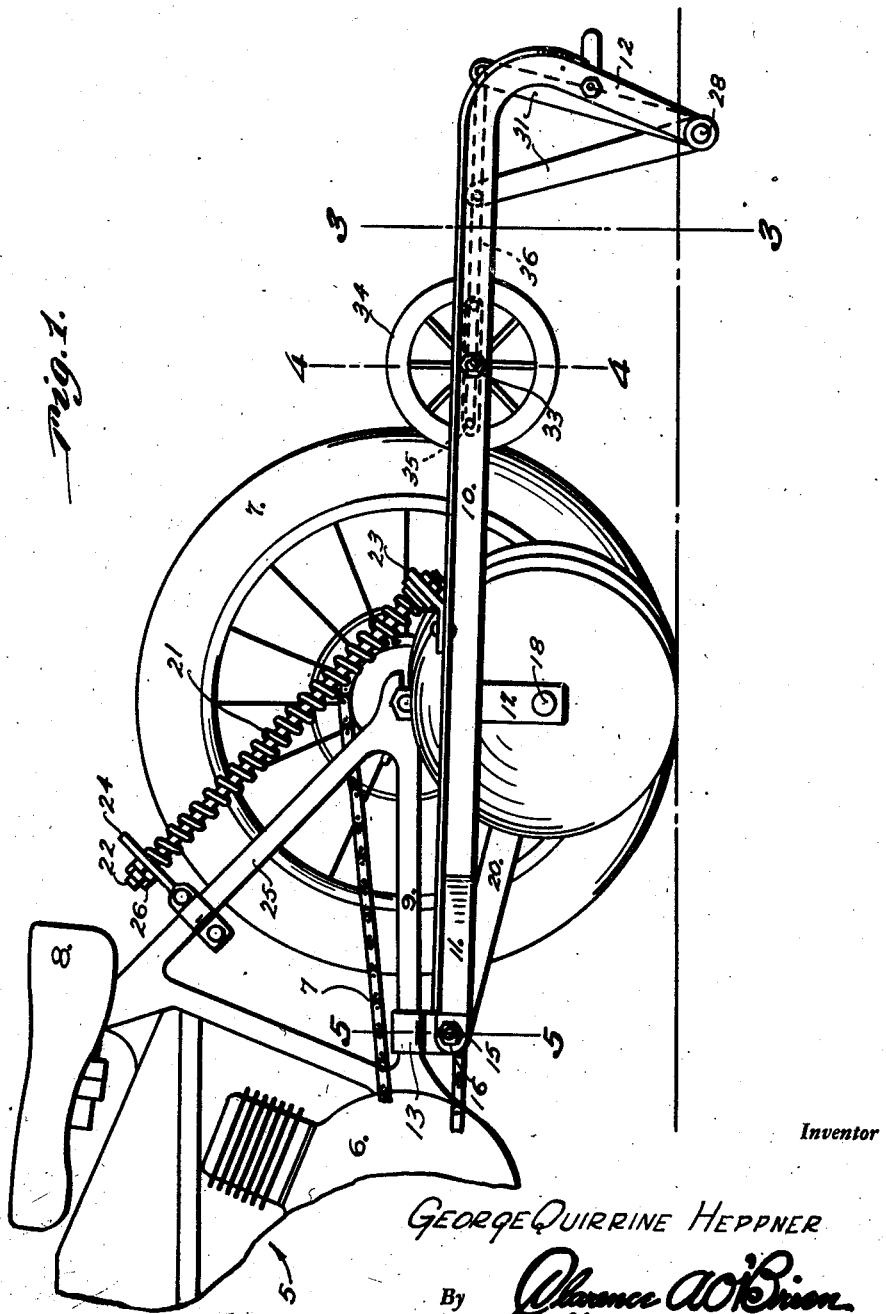
Inventor
GEORGE QUIRRINE HEPPNER
By Clarence A. O'Brien
and Harvey B. Jacobson
Attorneys

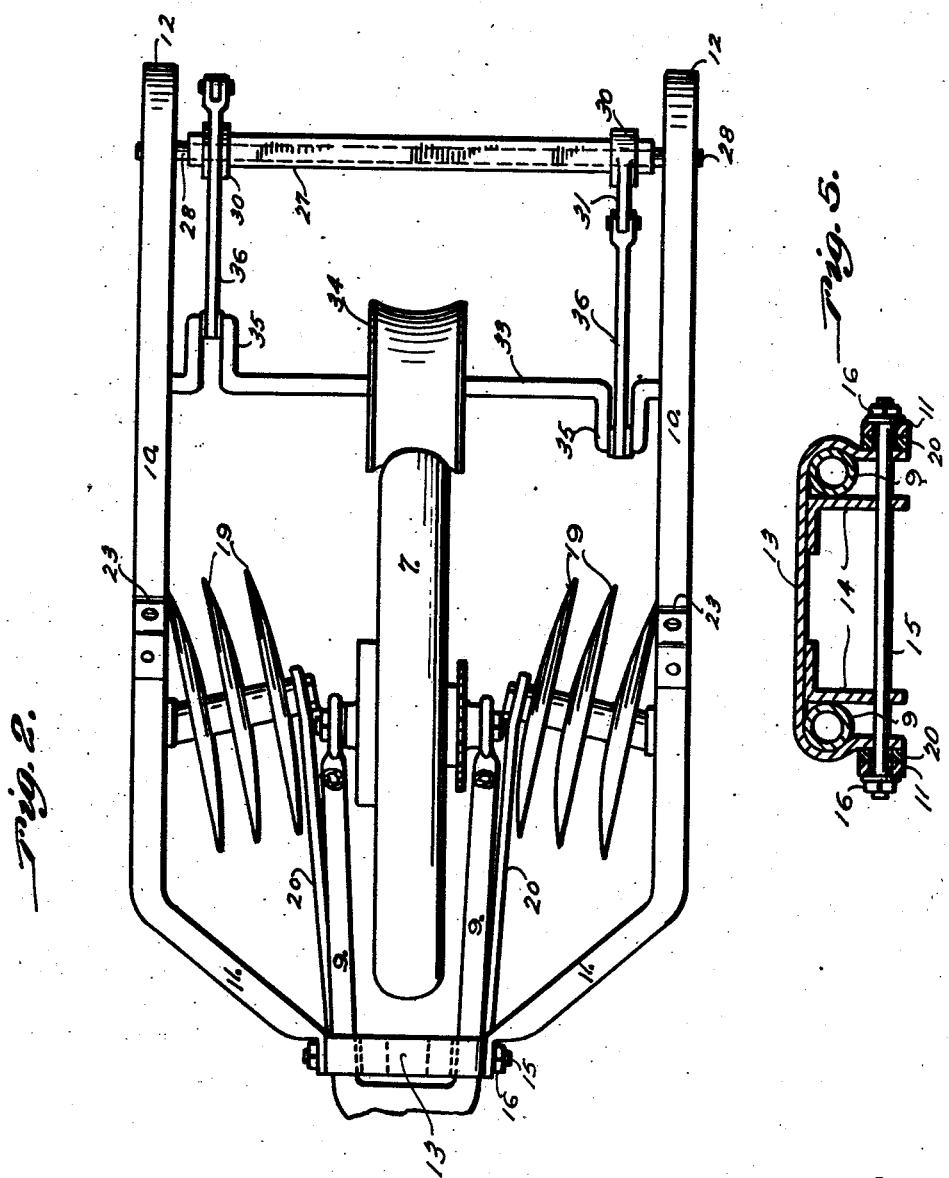

Nov. 7, 1944. G. Q. HEPPNER 2,362,374
CULTIVATING AND WEEDING ATTACHMENT FOR MOTORCYCLES
Filed Dec. 23, 1943 3 Sheets-Sheet 3
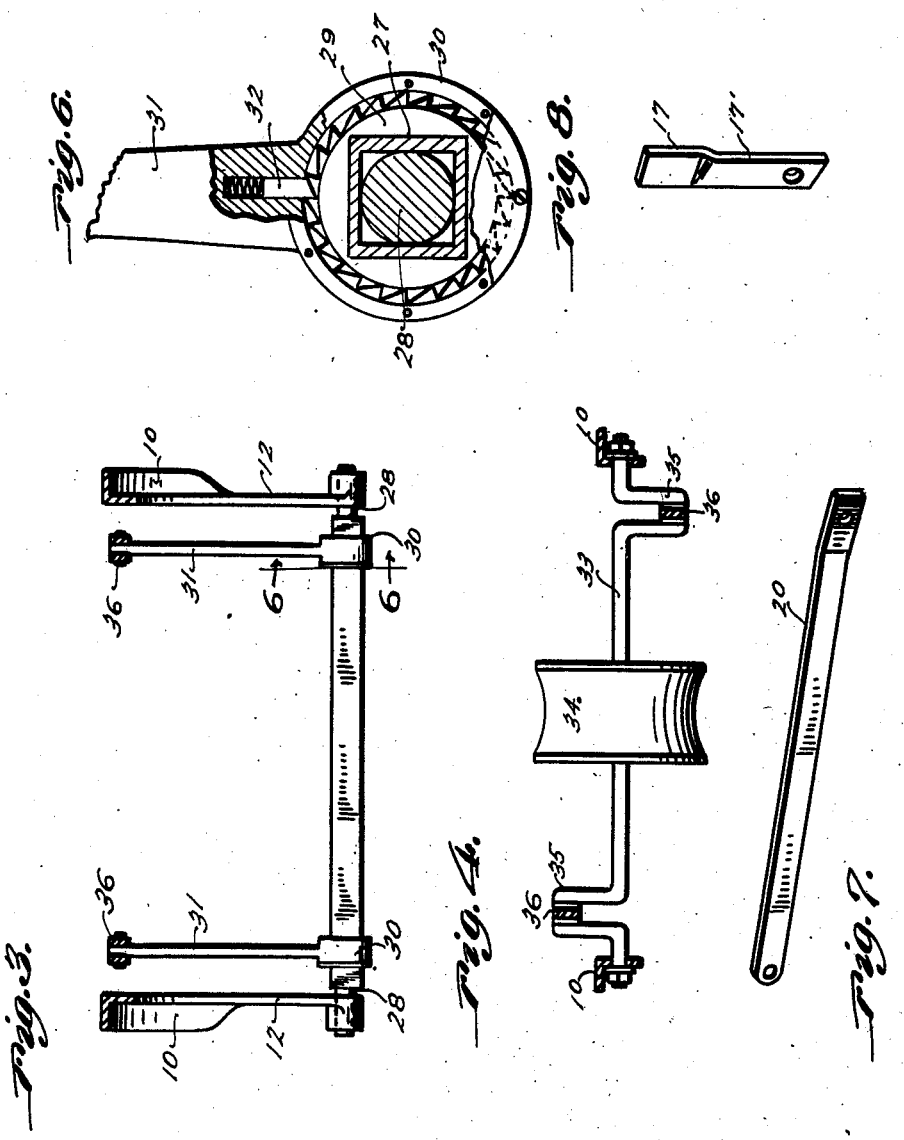
Inventor
GEORGE QUIRRINE HEPPNER Patented Nov. 7, 1944

2,362,374

UNITED STATES PATENT OFFICE 2,362,374

CULTIVATING AND WEEDING ATTACHMENT FOR MOTORCYCLES

George Quirrine Heppner, Oldenburg, Ind.

Application December 23, 1943, Serial No. 515,438

4 Claims. (Cl. 97—35)

This invention relates to a novel cultivating and weeding attachment for motorcycles, and the primary object of the invention is to provide a device of this kind which shall be highly efficient in operation and simple and durable in construction.

Briefly described, the attachment includes a suitable frame adapted to be secured to the rear of the motorcycle so that the rear supporting wheel of the latter is centrally received within the forward part of the frame and so that the attachment may be effectively drawn between rows by the motorcycle. Gangs of cultivator discs are carried by the frame at opposite sides of the rear motorcycle supporting wheel, and a rotary weeding and mulch spreading rod is provided transversely of the frame at the rear of the latter, means being provided for driving said rod from the rear supporting wheel of the motorcycle.

The invention contemplates the provision of means for yieldingly pressing the frame downwardly so that the cultivator discs and the rotary weeding and mulch spreading rod will effectively engage and penetrate the soil for efficient action.

The invention further contemplates the provision of simple and efficient means for attaching the device to the frame of the motorcycle for being effectively drawn thereby.

Another object is to provide simple and efficient driving means for the rotary weeding and mulch spreading rod.

Other objects and features of the invention will become apparent from the following description when considered in connection with the accompanying drawings, and the invention consists in the novel form, combination and arrangement of parts hereinafter more fully described, shown in the drawings, and claimed.

In the drawings, wherein like reference characters indicate corresponding parts throughout the several views:

Figure 1 is a side elevational view of an attachment constructed in accordance with the present invention and applied to a motorcycle, the rear portion of the motorcycle being shown.

Figure 2 is a top plan view thereof, with parts omitted for sake of clearness.

Figure 3 is a transverse section taken on line 3—3 of Figure 1.

Figure 4 is a transverse section taken on line 4—4 of Figure 1.

Figure 5 is an enlarged transverse section taken on the plane of line 5—5 of Figure 1.

Figure 6 is an enlarged fragmentary section taken on the plane of line 6—6 of Figure 3, but with parts broken away and in section, to reveal details of construction.

Figure 7 is a perspective view of one of the braces for supporting the inner ends of the axles which carry the cultivator discs, and Figure 8 is a perspective view of one of the hangers which support the outer ends of the axles which carry the cultivator discs.

Referring in detail to the drawings, 5 indicates a motorcycle of conventional type having a power plant 6 for driving a rear supporting wheel 7 through chain gearing 7', the usual saddle for the occupant of the motorcycle being provided, as at 8. As usual, the rear supporting and driving wheel 7 is carried by a rear fork having spaced rearwardly extending arms 9 at the bottom thereof.

The present attachment, which is designed to be applied to the rear of the motorcycle for being drawn along by the latter between rows being cultivated, includes a suitable frame which embodies a pair of spaced beams 10 provided with forwardly converging end portions 11 and downwardly directed rear end portions 12. The forward ends of beams 10 are connected by an attaching clamp which includes an inverted saddle member 13 of substantially U-shape adapted to be snapped over the fork arms 9 of the motorcycle frame in front of the rear supporting wheel 7 of the motorcycle, as shown clearly in the drawings. This clamp further includes inner jaws 14 fixed by welding, or the like, to the intermediate portion of saddle member 13 and arranged to engage the arms 9 of the fork at the inner sides of the latter, the outer jaws or end portions of the saddle member 13 being connected by a clamping bolt 15 which passes therethrough as well as through openings in the jaws 14, as shown in Figure 5. The forward ends of beams 10 are apertured to receive the projecting ends of the bolt 15, and nuts 16 are threaded on the ends of bolt 15 so as to tightly draw the outer jaws of the clamp toward each other for firmly and securely rigidly attaching the frame of the attachment to the rear fork of the motorcycle.

Rigid with and depending from the beams 10 near the forward ends thereof are hangers 17 having twisted lower portions 17' in the lower ends of which are suitably fixed the outer ends of stub axles 18 carrying a series of spaced cultivator discs 19. Due to the twisting of the lower portions of hangers 17, as at 17', the stub axles 18 are disposed to extend inwardly and rearwardly at a slight oblique angle, and the cultivator discs 19 are thus supported in gangs at opposite sides of the rear motorcycle wheel 7. The inner ends of the stub axles 18 are suitably supported and braced by brace rods 20 having their forward ends received on clamping bolt 15 inwardly of the nuts 16, and having their rear ends suitably secured to the inner ends of the stub axles 18. By reason of the attachment of the forward ends of beams 10 to clamping bolt 15, the beams 10 are capable of downward movement so as to permit the discs 19 and the weeding and mulch spreading rod, to be presently described, to be forced into the surface of the soil. For effecting this downward pressure, springs 21 are utilized, one of which is associated with each beam 10. As shown, each spring 21 encircles a rod 22 that passes through a bracket 23 fixed to the associated beam 10 and a further bracket 24 secured on the upper arm 25 of the rear motorcycle frame fork at the adjacent side of said fork. The spring 21 abuts the brackets 23 and 24 at its opposite ends, and the slight downward movement of the beams 10 under the influence of springs 21 is adjustably controlled by nuts 26 threaded on the forward upward ends of the rods 22. A vertically yieldable pressure means is thus provided for the beams 10 at opposite sides of the rear motorcycle wheel 7.

Supported by the lower ends of the downwardly directed rear end portions 12 of beams 10 is a rotary weeding and mulch spreading shaft 27. As shown clearly in Figures 3 and 6, the shaft 27 is hollow and of rectangular cross section and is journaled at its ends on cylindrical stub shafts 28 carried by and projecting inwardly from the lower ends of the downturned portions 12 of beams 10. Means is provided for driving the shaft 27 in the same direction as the rear motorcycle wheel 7 turns upon forward travel of the motorcycle. This is counterclockwise, as viewed in Figure 1, and the driving means includes ratchet wheels 29 secured on opposite ends of the shaft 27 and received in bearings 30 on corresponding ends of ratchet levers 31, said levers carrying spring-pressed ratchet detents 32 cooperating with the teeth of ratchet wheels 29. A transverse crankshaft 33 is journaled in the beams 10 and carries an intermediate pulley 34 arranged to bear upon the periphery of the rear motorcycle wheel 7 at the rear of the latter. Shaft 33 has cranks 35 operatively connected by pitmans 36 with the upper ends of levers 31. The arrangement is such that, upon forward travel of the motorcycle, the rear wheel 7 will drive pulley 34 and through the connections described will alternately swing levers 31 forwardly and then rearwardly. When one lever 31 swings forwardly, it imparts a partial rotation to shaft 27, and this rotation is subsequently continued by the actuation of the other lever 31. Thus, efficient and simple means is provided for driving the rotary shaft 27 from the rear wheel of the motorcycle.

In use, the attachment is drawn between rows upon forward travel of the motorcycle, the cultivator discs 19 effectively cutting and breaking up the soil in advance of the bar 27. At the same time, bar 27 is rotatably driven by the means described so as to effectively pull weeds and spread the weeds, leaves and the like so as to leave a desirable thickness of mulch. Due to the action of springs 21, the cultivator discs are caused to penetrate the soil as the bar 27 is caused to operate in the soil slightly below the surface. A power-drawn cultivating and weeding device is thus had which may be operated at low cost. The attachment may be manufactured cheaply and is comparatively convenient to apply to a motorcycle for use. Also, the device provides for efficient cultivating and mulch spreading operations, as well as thorough pulling or destruction of weeds. Minor changes in the details of construction illustrated and described are contemplated, such as fairly fall within the spirit and scope of the invention as claimed.

What I claim as new is:

1. In a cultivating and weeding attachment for motorcycles, a frame including spaced beams having downwardly directed rear ends, and means to secure the forward end of the frame to the rear fork of a motorcycle with the rear driving and supporting wheel of the motorcycle received centrally between the beams, and earth working elements within the frame and supported by the beams, inwardly and rearwardly extending stub shafts supported by the beams at opposite sides of the motorcycle wheel, said earth working elements comprising gangs of cultivator discs mounted on said stub axles.

2. In a cultivating and weeding attachment for motorcycles, a frame including spaced beams having downwardly directed rear ends, and means to secure the forward end of the frame to the rear fork of a motorcycle with the rear driving and supporting wheel of the motorcycle received centrally between the beams, and earth working elements within the frame and supported by the beams, and spring means acting on the beams and having means to attach the same to the rear fork of the motorcycle for pressing the frame downwardly and causing the earth working elements to penetrate the soil.

3. In a cultivating and weeding attachment for motorcycles, a frame including spaced beams having downwardly directed rear ends, and means to secure the forward end of the frame to the rear fork of a motorcycle with the rear driving and supporting wheel of the motorcycle received centrally between the beams, and earth working elements within the frame and supported by the beams, said earth working elements including a transverse shaft rotatably supported by the lower ends of the downturned rear end portions of the beams, and means to drive said shaft from the rear supporting wheel of the motorcycle.

4. In a cultivating and weeding attachment for motorcycles, a frame including spaced beams having downwardly directed rear ends, and means to secure the forward end of the frame to the rear fork of a motorcycle with the rear driving and supporting wheel of the motorcycle received centrally between the beams, and earth working elements within the frame and supported by the beams, said earth working elements including a transverse shaft rotatably supported by the lower ends of the downturned rear end portions of the beams, and means to drive said shaft from the rear supporting wheel of the motorcycle, said last-named means including operating arms on the ends of the shaft, ratchet driving means between said arms and said shaft, a transverse crankshaft carried by the frame and having a pulley arranged to bear on the rear motorcycle wheel, and operating connections between said crankshaft and said levers.

GEORGE QUIRRINE HEPPNER.